(12) United States Patent
Ross et al.

(10) Patent No.: US 10,963,494 B2
(45) Date of Patent: Mar. 30, 2021

(54) INTERFACE FOR INITIATING AN INTEGRATION TASK

(71) Applicant: International Business Machines Corporation, Armonk, NY (US)

(72) Inventors: Martin A. Ross, Gosport (GB); Paul S. M. Thorpe, Winchester (GB); Robert B. Nicholson, Southsea (GB)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 16/204,037

(22) Filed: Nov. 29, 2018

(65) Prior Publication Data

US 2020/0175048 A1   Jun. 4, 2020

(51) Int. Cl.
| | | |
|---|---|---|
| *G10L 15/22* | (2006.01) | |
| *G06F 16/332* | (2019.01) | |
| *G06F 16/34* | (2019.01) | |

(52) U.S. Cl.
CPC .......... *G06F 16/3329* (2019.01); *G06F 16/34* (2019.01); *G10L 15/22* (2013.01); *G10L 2015/223* (2013.01)

(58) Field of Classification Search
CPC ..... G06F 16/3329; G06F 16/34; G10L 15/22; G10L 2015/223
See application file for complete search history.

(56) References Cited

U.S. PATENT DOCUMENTS

| | | | |
|---|---|---|---|
| 9,620,113 B2 | 4/2017 | Kennewick | |
| 9,760,566 B2 | 9/2017 | Heck | |
| 9,912,810 B2 | 3/2018 | Segre | |
| 10,297,253 B2* | 5/2019 | Walker, II | G10L 15/22 |
| 2018/0082683 A1* | 3/2018 | Chen | G06F 21/6263 |
| 2018/0196683 A1* | 7/2018 | Radebaugh | G06F 3/167 |

FOREIGN PATENT DOCUMENTS

WO        2018033897 A2     2/2018

OTHER PUBLICATIONS

"Workbot—An enterprise Slackbot platform", Workato, last printed Sep. 25, 2018, 11 pages, <https://www.workato.com/workbot-slack>.

(Continued)

*Primary Examiner* — Abul K Azad
(74) *Attorney, Agent, or Firm* — Michael D. Purdham

(57) ABSTRACT

A computer obtains an integration document comprising integration instructions that, when executed, causes two or more software applications to interact to perform an integration task. The computer determines, from the integration instructions of the integration document, task information representative of at least the integration task. The computer generates, based on the task information, a conversation databank entry for a natural language interface, wherein the conversation databank entry is usable by the natural language interface to determine whether a user desires the integration task to be performed, by processing the conversation databank entry and a natural language input provided by the user to the natural language interface.

20 Claims, 8 Drawing Sheets

(56) References Cited

OTHER PUBLICATIONS

Mell et al., "The NIST Definition of Cloud Computing", National Institute of Standards and Technology, Special Publication 800-145, Sep. 2011, 7 pages.
Russom, Philip, "iPaaS: A Response to New Business and Technology Requirements", UP | Transforming Data with Intelligence, Feb. 12, 2018, 8 pages, <https://tdwi.org/articles/2018/02/12/diq-all-ipaas-response-to-business-and-tech-requirements.aspx>.
Smiers, Leon, "Integrating the Chatbot", Jun. 26, 2017, Capgemini Worldwide, 12 pages, <https://www.capgemini.com/2017/06/integrating-the-chatbot/.

* cited by examiner

INTERFACE FOR INITIATING AN INTEGRATION TASK

BACKGROUND

The present invention relates generally to interfaces for initiating an integration task, and more particularly to generating data for an interface of such a system.

An ongoing issue in the field of software engineering is that different software applications or packages are not usually designed to be compatible with one another, e.g., as they store data in different formats, and are therefore usually unable to directly communicate with one another. There has therefore been an increasing interest in integration programs that can enable communication or "integration" between different software applications. Such integration programs define how different software applications are to interact in order to perform a certain "integration task," such as the exchange of certain information. Thus, integration programs provide a way for users to automate tasks that require interactions between different software packages or applications.

SUMMARY

Disclosed herein are embodiments of a method, system, and computer program product for generating for generating a conversation databank entry usable by a natural language interface. A computer obtains an integration document comprising integration instructions that, when executed, causes two or more software applications to interact to perform an integration task. The computer determines, from the integration instructions of the integration document, task information representative of at least the integration task. The computer generates, based on the task information, a conversation databank entry for a natural language interface, wherein the conversation databank entry is usable by the natural language interface to determine whether a user desires the integration task to be performed, by processing the conversation databank entry and a natural language input provided by the user to the natural language interface.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. The drawings are not drawn to scale.

Figure 1:
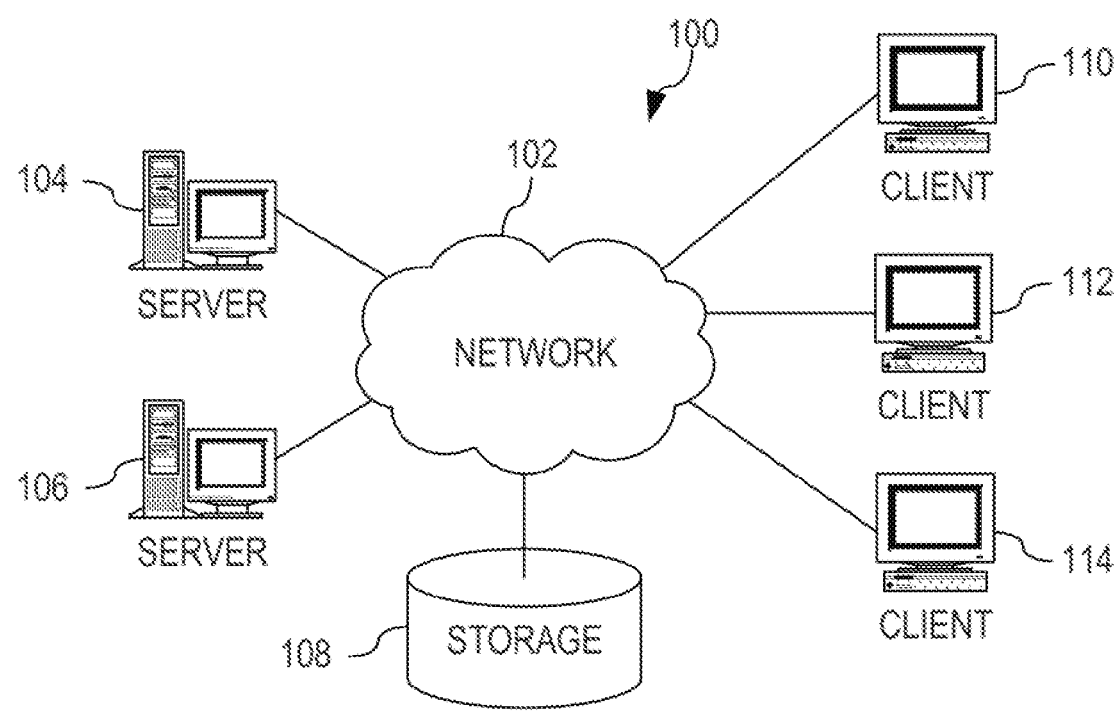
FIG. 1 depicts a pictorial representation of an example distributed system in which aspects of some embodiments of the present disclosure may be implemented.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

In the context of the present application, where embodiments of the present disclosure constitute a method, it should be understood that such a method may be a process for execution by a computer, i.e. may be a computer-implementable method. The various steps of the method may therefore reflect various parts of a computer program, e.g., various parts of one or more algorithms.

Also, in the context of the present application, a system may be a single device or a collection of distributed devices that are adapted to execute one or more embodiments of the methods of the present disclosure. For instance, a system may be a personal computer (PC), a server or a collection of PCs and/or servers connected via a network such as a local area network, the Internet and so on to cooperatively execute at least one embodiment of the methods of the present disclosure.

To generate an integration program, an application program interface (API) can be used, which may provide a library of different subroutines, protocols, and tools for enabling communication between different software applications. These APIs are controlled through API calls. However, these API calls are very difficult for non-technical users to invoke, unless a user-friendly interface is provided to call the APIs. Even so, a typical API user interface is not intuitive or natural for a non-technical user to operate.

Embodiments of the present disclosure provide for generating data for analysis or use by a natural language interface by processing integration instructions of an integration document. Integration instructions define how two different software applications are to interact with one another in order to perform a task, such as exchange of information (which will be referred to herein as an "integration task"). Thus, a conversation databank entry (which can refer to an entry in a databank for such a natural language interface which a user may have a "conversation" with) generated by embodiments of the present disclosure can be associated with an integration task. The conversation databank entry can be used by the natural language interface to determine, based on a user's natural language input, whether the user desires the associated integration task to be initiated.

Embodiments of the present disclosure utilize the fact that an integration document, detailing an integration task, can be processed to generate a conversation databank entry for a natural language interface that enables the natural language interface to identify a user's desire to perform the integration task.

The internal knowledge or specific instructions of an integration process can be used to generate a conversation databank entry. This provides conversation databank entries with highly accurate and reliable identification of a desired integration task to be performed.

The embodiments of the present disclosure generate a conversation databank entry that is associated with a particular integration task. The conversation databank entry can thereafter be used by a natural language interface to determine, based on a natural language input, whether a user of the interface desires the integration task associated with the conversation databank entry to be performed.

Repeatedly generating conversation databank entries enables the construction of a conversation databank for a natural language interface that is able to initiate different integration tasks in response to different natural language inputs. This enables non-technical users to control interactions between software applications using an intuitive input methodology (i.e. natural language), rather than using potentially complex methodologies such as API calls. Moreover, proposed embodiments enable complex integration tasks to be performed without requiring a user to know where data is stored and/or how their applications work/interact, which significantly increases productivity by end users. These improvements and/or advantages are a non-exhaustive list of example advantages. Embodiments of the present disclosure exist which can contain none, some, or all of the aforementioned advantages and/or improvements.

A natural language interface is any suitable interface that can receive a natural language input (or "utterance") from a user, e.g., via an input interface, in the form of text, speech, or other natural language input methods. A natural language is any language that has been developed naturally in use by humans (as opposed to a constructed/artificial language or programming code).

Using integration instructions (obtained from an integration document) to generate the conversation databank entry enables internal knowledge of how the integration task is performed to be used to process a natural language input. In other words, rather than a mere superficial identification of a task, a more complete conversation databank entry can be generated.

By processing an integration document to generate a conversation databank entry, potentially complex or custom integration tasks (e.g., involving more than two applications) designed by a technical user can be automatically made available for use by a non-technical user, without the user requiring knowledge of the existence of a said integration task. This increases the flexibility of the overall integration software package.

Moreover, by enabling natural language inputs of a user to control or determine an integration task to be performed, the user is not required to know or use technically complex API systems or API calls. Thus, embodiments of the present disclosure provide a new system and interface that provides a non-technical user with the ability to call or indicate integration tasks to be performed with a high degree of personalization.

The integrations instructions may, in use, be executed on a different system than the system that performs the method disclosed herein. For example, the integration instructions may be executed on a mobile or cellular phone, whereas the methods are executed on a cloud-computing system.

Embodiments of the present disclosure provide a computer-implemented method for generating a conversation databank entry. The computer-implemented method comprises obtaining an integration document comprising integration instructions that, when executed, causes two or more software applications to interact or exchange information to thereby perform an integration task. The method also comprises determining, from the integration instructions of the integration document, task information representative of at least the integration task. The method further comprises generating, based on the task information, a conversation databank entry for a natural language interface (where the conversation databank entry is usable by the natural language interface to determine whether a user desires the integration task to be performed) by processing the conversation databank entry and a natural language input provided by the user to the natural language interface.

Optionally, obtaining an integration document can comprise obtaining an integration document formed of computer code providing integration instructions on how the two or more software applications are to interact or exchange information to perform the integration task. Put another way, the integration document may contain code in any programming language suitable for defining an interaction between two or more software applications or packages. This code is processable by the proposed method to generate task information identifying/representing the integration task performed when the code is executed (i.e., by a processor). Exemplary programming languages for code include: C-based languages (e.g., C, C++, C #, Python, Perl, and/or Java-based languages), Fortran, BASIC, Assembly language, and so on.

Generating a conversation databank entry may comprise generating example natural language inputs based on the task information, where the example natural language inputs are usable by the natural language interface to compare to a natural language input provided by a user to thereby determine whether the user desires the task performed by the integration process to be performed.

Thus, the method disclosed herein is able to generate example natural language inputs (or "example utterances") for a conversation databank entry. Some natural language interfaces may compare these example natural language inputs to a user-provided natural language input to identify whether the user wishes the associated integration task to be performed. By way of example, if a user-provided natural language input is similar to an example natural language input of a first conversation databank entry, then it can be identified that the user wishes the integration task associated with the first conversation databank entry to be performed. In other words, the example natural language inputs can be used by a natural language interface to determine a meaning or intent behind a user's natural language input.

In some embodiments, determining task information further comprises determining identity information representative of the identity of the two or more software applications, so that the task information comprises the identity information. By determining identity information of the two or more software applications, additional context for generating the conversation databank entry can be determined. This increases an accuracy of the conversation databank entry and improves a likelihood that a desired integration task will be identified by the natural language interface.

In some embodiments, determining task information may further comprise determining actions performed using the two or more software applications when the integration instructions are executed where the task information comprises the determined actions. Thus, the specific actions taken to perform the integration task may be used to generate the conversation databank entry. This means that the conversation databank entry can more accurately characterize the sub-tasks performed to perform an overall integration task.

Optionally, determining task information comprises determining reference information representative of any references or execution triggers to one or more other integration instructions for a respective one or more other integration tasks, so that the task information further comprises the reference information.

Thus, the full set of possible integration tasks, and their interactions, can be used when generating a conversation databank entry. In other words, the integration flows (i.e., how integrations react with one another) may be used to generate a conversation databank entry.

In some embodiments, determining task information can comprise identifying one or more other integration documents referenced by the integration instructions and determining task information further based on the integration instructions of the referenced one or more integration documents. Thus, referenced integration instructions (i.e., referenced integration tasks) may define the conversation databank entry.

In some embodiments, determining task information can comprise determining variable information representative of at least one input variable of the integration task, so that the task information further comprises the variable information. An input variable is an input required to perform or complete a particular task. For example, an input variable may define the type of desired data to be transferred from one application to another (such as client data or contact information) or may define an origin/destination of data to be transferred.

In some embodiments, generating a conversation databank entry can comprise generating a conversation databank entry that further identifies the at least one input variable of the integration task. A conversation databank entry may therefore define input variables associated with a particular integration task. This can be used to improve a recognition of user-provided natural language inputs (e.g., as such an input may identify values for input variables to be used in a desired integration task). Embodiments thereby enable an improved performance for a natural language interface to be provided by including input variables for an integration task in a generated conversation databank entry.

Corresponding methods of operating a natural language interface may comprise generating a control signal for initiating an integration task (associated with an identified conversation databank entry), in which the control signal comprises values for input variables required for the integration task, the input variables being identified from information contained in the conversation databank entry.

By way of example only, a user-provided natural language input may be "Send my contact information to Jenny." A natural language interface may identify "to Jenny" as a possible input variable, and search through conversation databank entries to identify a conversation databank entry having an input variable for which "to Jenny" is a suitable entry (such as an input variable for "Destination Name" or "Destination Contact").

In other words, a conversation databank entry may comprise information on input variables required for an integration task associated with the conversation databank entry, which information is usable by a natural language interface to provide values for a control signal to initiate the integration task.

By way of continued example, if the user-provided natural language input is "Send my contact information to Jenny" and the natural language interface identifies a conversation databank entry associated with an integration task of "Sending my contact information" with an input variable for destination, a control signal can be generated for initiating the integration task, said control signal comprising a value of "Jenny" as an input for the destination.

Embodiments of the present disclosure also include a computer-implemented method of operating a natural language interface. The method comprises obtaining one or more conversation databank entries generated by a method previously described and a natural language input provided by a user. The method comprises processing the natural language input and the at least one conversation databank entry to determine whether the user desires any one or more integration tasks associated with any one or more of the conversation databank entries to be performed. In response to determining that the user desires an integration task associated with any of the conversation data bank entries to be executed, the method comprises generating a control signal for initiating the execution of the integration instructions associated with each desired integration task.

Embodiments of the present disclosure also include another computer-implemented method of operating a natural language interface. The method comprises obtaining one or more conversation databank entries generated by a method comprising a step of generating a conversation databank entry that further identifies the at least one input variable of the integration task. The method also comprises obtaining a natural language input provided by a user. The method then processes the natural language input and the at least one conversation databank entry to determine whether the user desires any one or more integration tasks associated with any one or more of the conversation databank entries to be performed. In response to determining that the user desires an integration task associated with any of the conversation data bank entries to be executed, the following is performed: identifying one or more input variables in the natural language input; and generating a control signal for initiating the execution of the integration instructions associated with each desired integration task, where the control signal comprises the one or more identified input variables in the natural language input for input to the integration instructions.

Embodiments of the present disclosure also include a computer program comprising code means for implementing any previously described method when said program is run on a computer and a computer system comprising at least one processor and the computer program product previously described, where the at least one processor is adapted to execute the computer program code of said computer program product.

Embodiments of the present disclosure also include a system for generating a conversation databank entry. The system comprises a document obtainer adapted to obtain an integration document comprising integration instructions that, when executed, causes two or more software applications to interact or exchange information to thereby perform an integration task. The system also comprises a task information determiner adapted to determine, from the integration instructions of the integration document, task information representative of at least the integration task. The system also comprises a databank entry generator adapted to generate, based on the task information, a conversation databank entry for a natural language interface, where the conversation databank entry is usable by the natural language interface to determine whether a user desires the integration task to be performed, by processing the conversation databank entry and a natural language input provided by the user to the natural language interface.

Embodiments of the present disclosure also include a natural language interface comprising a databank obtainer adapted to obtain one or more conversation databank entries generated by the previously described system. The system also comprises an input interface adapted to obtain a natural language input provided by a user. The system also comprises an input processing unit adapted to process the natural language input and the at least one conversation databank entry to determine whether the user desires any one or more integration tasks associated with any one or more of the conversation databank entries to be performed; and in response to determining that the user desires an integration task associated with any of the conversation data bank entries to be executed, generate a control signal for initiating the execution of the integration instructions associated with each desired integration task.

FIG. 1 depicts a pictorial representation of an example distributed system 100 in which aspects of some embodiments of the present disclosure may be implemented. A distributed system 100 may include a network of computers in which aspects of the illustrative embodiments may be implemented. The distributed system 100 contains at least one network 102, which is the medium used to provide communication links between various devices and computers connected together within the distributed system 100. The network 102 may include connections, such as wire, wireless communication links, or fiber optic cables.

In the depicted example, first server 104 and second server 106 are connected to the network 102 along with a storage unit 108. In addition, clients 110, 112, and 114 are connected to the network 102. The clients 110, 112, and 114 may be, for example, personal computers, network computers, or the like. In the depicted example, one or more of the first server 104 and second server 106 can provide data, such as boot files, operating system images, and applications to the clients 110, 112, and 114. Clients 110, 112, and 114 are clients to the first server 104 in the depicted example. The distributed system 100 may include additional servers, clients, and other devices not shown.

In the depicted example, the distributed system 100 can represent the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. The distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present disclosure, and therefore, the particular elements shown in FIG. 1 should not be considered limiting with regard to the environments in which the illustrative embodiments of the present disclosure may be implemented.

Figure 2:
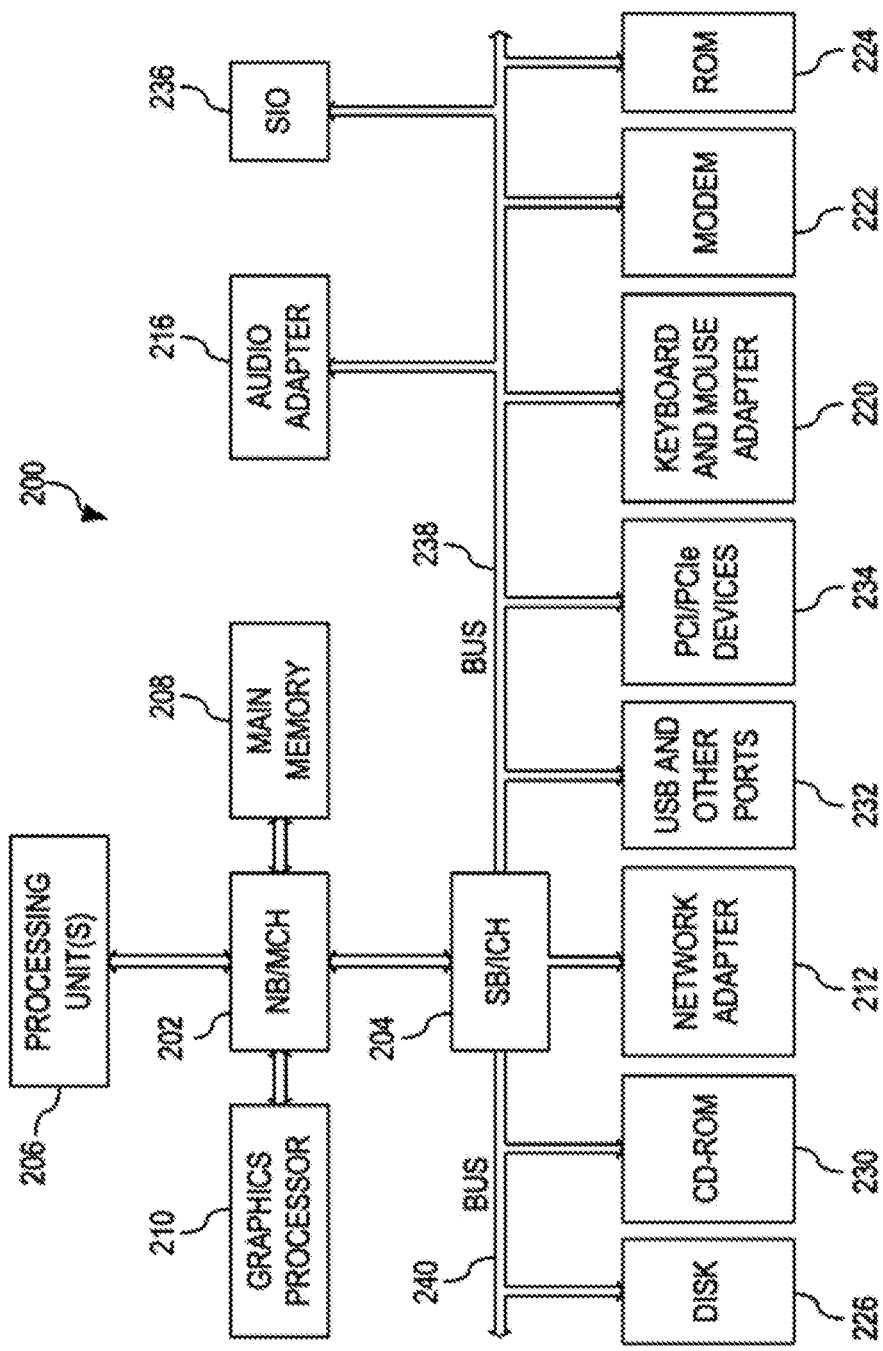
FIG. 2 is a block diagram of an example system in which aspects of some embodiments of the present disclosure may be implemented.

FIG. 2 is a block diagram of an example system 200 in which aspects of some embodiments of the present disclosure may be implemented. The system 200 is an example of a computer, such as client 110 of FIG. 1, in which computer usable code or instructions implementing the processes for illustrative embodiments of the present disclosure may be located.

In the depicted example, the system 200 employs a hub architecture including a north bridge and memory controller hub (NB/MCH) 202 and a south bridge and input/output (I/O) controller hub (SB/ICH) 204. One or more processing units 206, a main memory 208, and a graphics processor 210 are connected to NB/MCH 202. The graphics processor 210 may be connected to the NB/MCH 202 through e.g., an accelerated graphics port (AGP) or a peripheral component interconnect express port (PCIe).

In the depicted example, a network adapter 212 connects to SB/ICH 204, which may enable connection to a local area network (LAN) or any other form of network as appropriate for system 200. An audio adapter 216, a keyboard and mouse adapter 220, a modem 222, a read only memory (ROM) 224, a hard disk drive (HDD) 226, a CD-ROM drive 230, a universal serial bus (USB) port and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system (not depicted) runs on the processing unit 206. The operating system can coordinate and provide control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p® computer system, running the Advanced Interactive Executive (AIX®) operating system or the LINUX® operating system, or may be another server computer system running a different operating system. The system 200 may be a symmetric multiprocessor (SMP) system including a plurality of processors in processing unit 206. Alternatively, a single processor system may be employed.

Instructions for the operating system, the programming system, and applications or programs can be located on storage devices, such as HDD 226, and may be loaded into main memory 208 for execution by processing unit 206. Similarly, one or more message processing programs according to some embodiments may be adapted to be stored by the storage devices and/or the main memory 208.

The processes for illustrative embodiments of the present disclosure may be performed by processing unit 206 using computer usable program code, which may be located in a memory such as, for example, main memory 208, ROM 224, or in one or more peripheral devices, including HDD 226 and CD-ROM drive 230.

A bus system, such as first bus 238 or second bus 240 as shown in FIG. 2, may comprise one or more buses. The bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present disclosure.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

As detailed above, proposed embodiments provide a method for generating a conversation databank entry for a natural language interface. The conversation databank entry is generated by determining, from an integration document comprising integration instructions, task information that defines an integration task performed by executing the integration instructions. The task information is then processed to generate a conversation databank entry. Thus, the method generates a conversation databank entry associated with a particular integration task. A natural language interface is able to use the conversation databank entry to identify, from a natural language input, whether a user desires/wishes the integration task to be performed.

Figure 3:
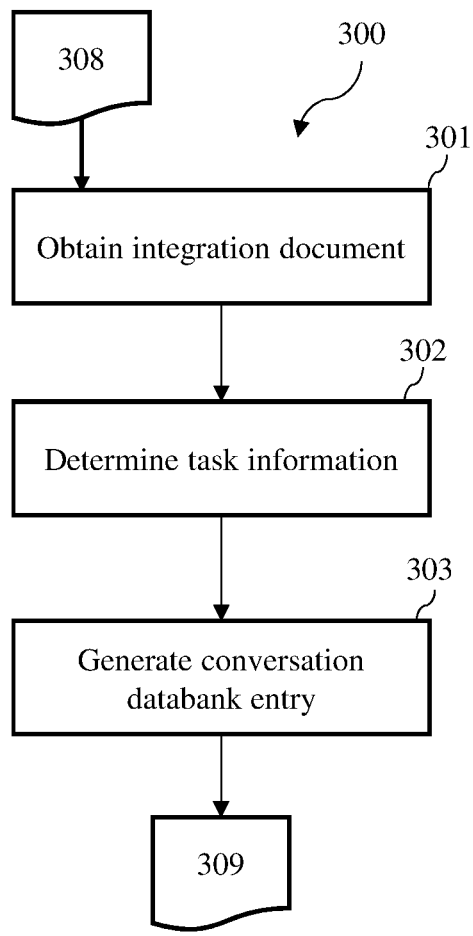
FIG. 3 is a flow diagram of a method of generating a conversation databank entry for a natural language interface according to some embodiments of the present disclosure.

Referring now to FIG. 3, there is depicted a flow diagram of a method 300 of generating a conversation databank entry 309 for a natural language interface according to some embodiments of the present disclosure. The method 300 may, for example, be performed by any previously described system, such as system 200 of FIG. 2.

The method 300 comprises an operation 301 of obtaining an integration document 308. The integration document 308 comprises integration instructions (e.g., computer code) which can define how two or more software applications interact to thereby perform an integration task. In other words, the integration instructions can define how software applications or packages are to communicate or interact with one another to perform an integration task. An integration task can be any task that requires the exchange of information or another communication between two or more different software applications or packages (e.g., a first application for storing data and a second application for communicating data to a user).

The method 300 also comprises operation 302 of determining task information based on the integration instructions of the integration document 308. The task information is representative of at least the integration task performed by executing the integration instructions.

Operation 302 may comprise extracting portions of the integration instructions that indicate or describe a task (or sub-tasks) performed when the integration instructions are executed. This extracted information can represent the integration task performed by the integration instructions. In particular, different aspects of extractable information may represent different possible aspects of task information, as later described.

The method 300 also comprises an operation 303 of generating a conversation databank entry 309 for a natural language interface based on the task information determined at operation 302. The structure of the conversation databank entry 309 may depend upon the architecture or design of the corresponding natural language interface, although one specific example is provided below.

In this way, internal knowledge of how an integration task is performed (i.e., the instructions used or variables required to perform the task) is used to generate a conversation databank entry. This means that the conversation databank entry accurately reflects a possible task to be performed, meaning that a corresponding natural language interface can accurately, and with a high probability, identify a correct integration task to be performed based on a user-provided natural language input.

In some embodiments, the operation 303 of generating a conversation databank entry 309 comprises obtaining or generating example natural language inputs based on the task information. Such examples can be used to compare to a user-provided natural language input to determine whether the user desires the integration task associated with the conversation databank entry to be performed.

The task information generated in operation 302 of method 300 may comprise identity information that identifies the software applications that interact or exchange information to perform a task when the integration instructions are executed. Thus, step 302 may comprise determining identity information from the integration instructions.

The task information may comprise information on the actions, and in some embodiments, sub-actions, performed when executing the integration instructions to perform the task. Thus, operation 302 may comprise determining actions performed when the integration instructions are executed (e.g., action information), which actions are identified in the task information.

In some embodiments, the task information may comprise reference information representative of any references or execution triggers to one or more other integration tasks. In other words, operation 302 may comprise identifying other integration instructions referenced in the integration instructions so as to identify other referenced integration tasks. Such information may be contained in the task information.

In some embodiments, the task information may comprise data information representing a type of data (e.g., contact information) to be exchanged or passed between the two or more applications when executing the integration instructions.

In some embodiments, the task information may comprise variable information representative of at least one input variable of the integration task. In other words, operation 302 may comprise identifying a variable of the integration task, being a value of the integration instructions that can differ between iterations of the task (such as an identity of information to be exchanged between applications or an identity of a final destination for information). In some examples, integration tasks may require values for input variables to be input in order to perform the integration task (e.g., identifying information to be extracted or a destination of where to send information from a software application). Such input variables can help identify a task, and therefore may form a portion of the task information.

In some embodiments, the task information may comprise title information naming the task. Thus, a name of the task may be determined from the integration instructions and included in the task information. Thus, pieces of information about an integration task performed by executing the integration instructions can be determined by inspecting, analyzing or processing the integration instructions. Each piece of information is representative of (an aspect of) the integration task performed, and can therefore form part or all of the task information obtained in operation 302.

Various other pieces of information suitable for helping to define a task performed when the integration instructions are executed would be readily apparent to the skilled person and may be obtained as an aspect of the task information.

In some embodiments, operation 302 comprises determining task information by extracting or identifying appropriate portions of the integration instructions representing aspects of a task performed when executing the integration instructions.

The structure and content of the conversation databank entry 309 may depend upon the information contained in the task information, as well as the architecture of the natural language interface for which it is designed, as will be discussed below.

An example of an example integration document, formed of integration instructions, is hereafter provided for contextual understanding:
    name: Example API

```
type: api
trigger-interfaces:
trigger-interface-1:
triggers:
createEmail:
assembly:
$ref: '#/integration/assemblies/assembly-1'
input-context:
data: email
output-context:
data: email
options:
resources:
- business-object: email
model:
$ref: '#/models/email'
triggers:
create: createEmail
type: api-trigger
action-interfaces:
action-interface-1:
type: api-action
business-object: Contact
connector-type: FirstApplication
connection-name: ExampleLoginAccount
actions:
RETRIEVEALL: { }
action-interface-2:
type: api-action
business-object: mail
connector-type: EmailService
connection-name: ExampleLoginAccount
actions:
CREATE: { }
assemblies:
assembly-1:
assembly:
execute:
- retrieve-action:
name: FirstApplication Retrieve Contact
target:
$ref: '#/integration/action-interfaces/action-interface-1'
filter:
input:
- variable: Request
```

-continued

```
$ref: '#/trigger/payload'
where:
AccountId: '{{$Request.contact}}'
limit: 1
allow-empty-output: false
allow-truncation: false
- create-action:
name: EmailService Create message
target:
$ref: '#/integration/action-interfaces/action-interface-2'
map:
mappings:
- Body:
template: '{{$FirstApplicationRetrieveContactMetadata}}'
- Subject:
template: 'Contact information for {{$Request.contact}}'
- To:
template: '{{$Request.to}}'
$map: ' /appconnect/map/v1'
input:
- variable: Request
$ref: '#/trigger/payload'
- variable: FirstApplicationRetrieveContact
$ref: '#/node-output/FirstApplication Retrieve Contact/response/payload'
- variable: FirstApplicationRetrieveContactMetadata
$ref: '#/node-output/FirstApplication Retrieve Contact/response'
- response:
name: response-1
reply-maps:
- title: email successfully created
status-code: 201
map:
$map: '/appconnect/map/v1'
input:
- variable: Request
$ref: '#/trigger/payload'
- variable: FirstApplicationRetrieveContact
$ref: '#/node-output/FirstApplication Retrieve Contact/response/payload'
- variable: FirstApplicationRetrieveContactMetadata
$ref: '#/node-output/FirstApplication Retrieve Contact/response'
- variable: EmailServiceCreatemessage
$ref: '#/node-output/EmailService Create message/response/payload'
mappings:
- contact:
template: '{{$Request.contact}}'
- to:
template: '{{$Request.to}}'
input: [ ]
models:
email:
name: email
properties:
to:
type: string
required: true
id: true
contact:
type: string
required: true
id: false
plural: email
description: ' '
operations:
create: '#/integration/assemblies/assembly-1'"
```

The above example integration document illustrates integration instructions for an integration task for passing contact information of a first person from a "FirstApplication" software application to a second person via an "EmailService" software application. Thus, the integration instructions provide code for communicating a first person's contact information from the "FirstApplication" software application, to the "EmailService" software application and onto another user.

In particular, the integration instructions describe how to retrieve (RETRIEVEALL) contact information of the first person from the "FirstApplication," and create (CREATE)

an email using the "EmailService." Other aspects of the code define the structure of the email and for setting up code variables.

Using the above example document, it is possible to extract and/or identify the applications the integration is interacting with (e.g., from "connector-type" entries) to thereby obtain identity information. For the example integration document, the identity information identifies that a "FirstApplication" application and an "EmailService" application are used.

Using the above example document, it is also possible to extract the actions undertaken by the integration instructions to perform the integration task. For example, from the "action" type, the actions RETRIEVEALL and CREATE respectively can be identified. In another example, from the action names (e.g., "FirstApplication Retrieve Contact" or "EmailService Create message") the actions "Retrieve" or "Create" can be identified.

In this way, the identified actions represent the task performed by the integration instructions when executed. The identified actions may therefore be extracted to form a portion of the task information during operation 302.

It is also possible to identify what type of information is transferred between applications when executing the integration instructions. This information may for example, be obtained from the "mappings" object or "business-object" of the above example document. In particular, from the above example document, one identifiable type of information is "contact information" (e.g., email address, telephone number, physical address, and so on) and another identifiable type of information is "mail" (e.g., another email address). This may form part of the task information, such that the task information is able to identify a data type of information transferred when the integration task is performed.

The above information may be identified from the parameters associated with the different "action-interfaces", i.e. "action-interface-1" and "action-interface-2." An action interface can thereby define the actions performed when the integration instructions are executed.

In some embodiments, the above information can also be extracted from the "assemblies" portion of the integration document. For example, it is also possible to identify the actions taken by searching for actions in the assemblies portions (e.g., —"retrieve-action:" and "—create-action:").

It is also possible to identify possible input variables required for the integration task, i.e. parameters that can differ between different iterations of the task (such as destination or identity of information to be transferred). In other words, the input variables are parameters that can be varied without requiring modification to the integration instructions (i.e., the integration task is performed in a same manner). For the example document, this information can, for example, be extracted by identifying "Requests" in the above identified document. For example, "$Request.contact" indicates that there is a request by the integration instructions for the name of the contact information to be obtained from the "FirstApplication" application, i.e. an input variable of the integration task is an identity of the first person who's contact information to be obtained from the FirstApplication application. By way of another example, "$Request.to" indicates that there is a request by the integration instructions for the identity of the second person to whom the obtained contact information is to be sent (via EmailService), i.e. an input variable of the integration task is an identity of the second person to whom the contact information of the first person will be sent.

It is also possible to identify a name or title information of the task. This can be performed by searching for a "name" in the above-identified documents. Here, the name is given as "Example API."

As this example indicates, task information can be obtained by extracting relevant portions of the integration instructions that define the task performed by the integration instructions when executed.

The task information may be processed to thereby generate a conversation databank entry 309 (i.e., for a conversation databank for the natural language interface). It will be well understood by the skilled person that a conversation databank is used by a natural language interface to interpret a natural language input of user to determine a task that the user desires to be performed. In particular, a conversation databank entry may contain information defining natural language inputs that indicate a desire to perform the specified task.

Figure 4:
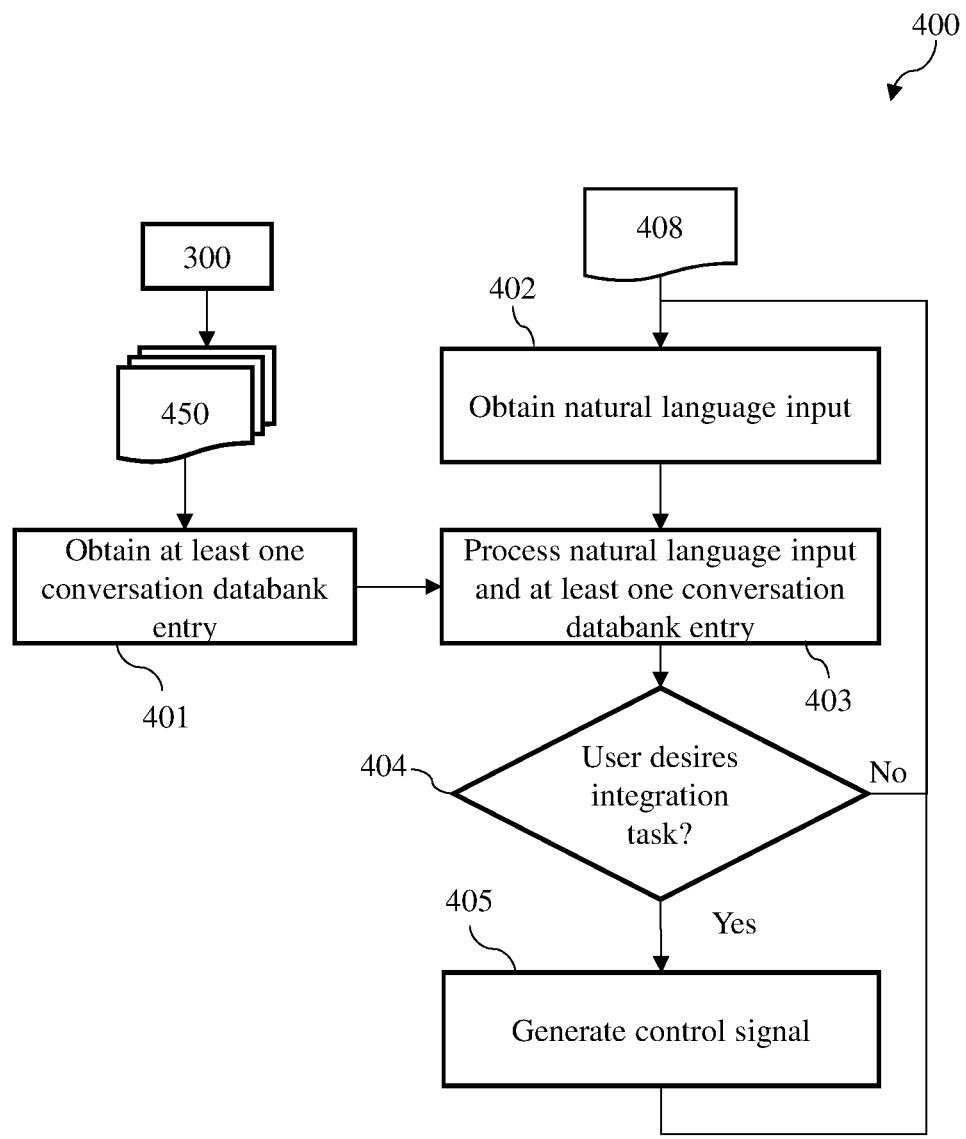
FIG. 4 is a flow diagram of a method of operating a natural language interface according to some embodiments of the present disclosure.

FIG. 4 illustrates a flow diagram of a method 400 of operating a natural language interface according to some embodiments of the present disclosure, for understanding the context of a conversation databank entry.

The method 400 comprises operation 401 of obtaining at least one conversation databank entry 450 (i.e., a conversation databank), each of which may be generated according to any previously described method 300.

The method 400 also comprises operation 402 of obtaining a natural language input 408 from a user. Operation 402 may comprise receiving a natural language input from an input interface such as a keyboard or microphone. Operation 402 may comprise processing an input from an input interface to thereby obtain the natural language input (such as performing speech processing an audio input to obtain a spoken natural language input). The natural language input may be obtained from any input interface for a processing system (such as a microphone, a keyboard, a touch-screen and so on).

The method also comprises operation 403 of processing the natural language input 408 and the at least one conversation databank entry 450 to determine, in operation 404, whether the user desires an integration task associated with any of the conversation databank entries to be performed.

In some embodiments, operation 403 may comprise consulting a conversation databank 450 to derive or identify a meaning of a user's natural language input. Operation 403 may comprise iterative steps of comparing the natural language input 408 (from a user) to each data entry of the conversation databank 450 to determine whether the user desires any tasks associated with data entries of the conversation databank 450 to be performed.

In some embodiments, a conversation databank entry 450 may comprise information on example natural language inputs that indicate a desire to perform the task associated with the conversation databank entry. Operation 403 may comprise comparing a user's natural language input 408 to the example natural language inputs of a conversation databank entry and, if sufficiently similar, determining in operation 404 that the user desires the task associated with the conversation databank entry to be performed. This comparison can be performed for each conversation databank entry in the conversation databank, and the databank entry having the most similar example natural language input may be identified. In some instances, no suitably similar databank entry can be identified, and the method may revert to operation 402 of obtaining a natural language input (e.g., requesting that the user repeat themselves or indicating a lack of understanding). In some instances, the user's natural language input 408 may indicate a desire to perform more than one task, associated with one or more conversation databank entries.

If an appropriate conversation databank entry has been identified, the method 400 moves to operation 405 of generating a control signal for instructing the task associated with the identified databank entry to be performed. In this way, a user can control tasks to be performed using a natural language input.

Operation 405 of generating a control signal may comprise generating values for one or more input variables of the integration task. Thus, the control signal may comprise values for the one or more input variables of the integration task. The values for the input variables may be obtained from the natural language input 408. If an integration task has been identified, but suitable values for input variables are not identifiable in the natural language input 408, operation 405 may comprise sub-parts of communicating with the user via a natural language interface to obtain values for the input variables for the integration task.

Operations 403 and 404 may further comprise determining a confidence level that the natural language input 402 corresponds to a given conversation databank entry. In response to the confidence level being above a predetermined value, it can be determined at 404 that the user desires the associated integration task to be performed, and an appropriate control signal can be generated at 405. Otherwise, the user may be presented with one or more clarifying questions.

An example of a conversation databank entry (and an example process of generating it) for use with such a natural language interface is hereafter provided. From the above described example integration document, it is possible to generate the following example conversation databank entry:

```
{ "intent": {
"name": "Example API",
"examples": [ "Send the FirstApplication contact information for Clive to Adam", "Send me contact information for Jenny"]}
"Entities": [{ to: "@sys-person" }{ contact: "@sys-person" }{ connector: [ "FirstApplication", "EmailService", "email" ] }]}
```

The portion "intent" provides information for identifying, from a natural language input of a user, a desired task of the user. The "entities" portion provides context for the desired task, e.g., identifying potential variables or inputs for a task or identifying where the task is to be performed. Information from the "intent" portion may be used by a natural language interface to identify whether a user desires the associated task to be performed. Information from the "entities" portion may be used to confirm that a user wishes the desired task to be performed (e.g., rather than another, similar task that does not use the identified entities). Thus, both the "intent" and "entities" portions of the example conversation databank entry may be used to determine whether the user desires the integration task associated with the conversation databank entry to be performed.

The conversation databank entry may therefore indicate relevant information for determining (from a user's natural language input) whether the user desires the task associated with the conversation databank entry to be performed.

For example, the conversation databank entry may comprise a name portion (shown as "name":) formed from title information of the task information. This name portion may be replicated directly from extracted task information from the integration document. It will be clear that there is a desire from the user to perform the task if the name of the task is given by the user (e.g., "Perform the task Example API").

In some embodiments, the conversation databank entry may also comprise information on the applications used during performance of the associated task and/or actions performed during performance of the associated task (e.g., "FirstApplication", "EmailService", "email"), also called "connectors" herein. A user's natural language input can be parsed to determine if it contains such information, which could indicate a desire by the user to perform the task associated with the conversation databank entry.

In some embodiments, the "connector" entity could be a default entity created to enumerate the possible names for connectors or applications used to perform the integration task—in this case the possible values are the names of the connectors/applications used: "FirstApplication" and "EmailService". However, certain applications may additionally provide synonyms in metadata, or be associated with particular synonyms. For example, "email" may be considered a synonym for the "EmailService" application, e.g., as set out in metadata for EmailService or metadata for the EmailService connector type.

In some embodiments, the conversation databank entry may also comprise information on the input variables for the integration task (here: to: "@sys-person" and contact: "@sys-person"). This information may be used by a natural language interface to determine whether a user's natural language input corresponds to the conversation databank entry, and also to provide instructions in a control signal for initiating the integration task.

For the "entities section" the "to" (or "recipient") and "contact" entities may be created due to a requirement for those as input variables to the integration (i.e. the integration instructions may need this information in order to carry out the integration task). The types of these could be defined by connector-type metadata as, for example, a "name" or "email."

In some embodiments, the conversation databank entry may also comprise example natural language inputs (shown in "examples":) that would (if said by a user) indicate a desire to perform the task. There are several conceivable ways for example natural language inputs to be generated. In an embodiment, the actions (here: RETRIEVEALL and CREATE) or action names (here: "FirstApplication Retrieve Contact" or "EmailService Create message") could be analyzed to identify action/trigger verbs (such as "Create" or "Retrieve"). These verbs (and determined synonyms thereof) could be combined with extracted details of the application (e.g., the names of the applications referenced by an integration task), objects, possible inputs (e.g., what the integration requires as input, such as identity of person to send email to) and so on, in order to generate an example utterance. This combination may exploit known natural-language grammatical constructs in order to generate an example utterance.

One possible utterance example could be: "RETRIEVE contacts from FirstApplication and CREATE Email to <name>". The phases "Retrieve Contact from First Application" and "Create Email" can be extracted, for example, from the action names. Alternatively, the words "Retrieve" could be identified from the action "RETRIEVEALL", the object "Contact" could be retrieved from the business object associated with the action (i.e. from the line "business-object: Contact") and the application name "FirstApplication" could be retrieved from the connector type associated with the action (i.e. from the line "connector-type: FirstApplication"). Thus, an example utterance may be built using at least the "action interfaces" contained the integration document, e.g., "action-interface-1" and "action-interface-2".

A second example utterance, which relies on the use of synonyms, could be: "GET contacts from FirstApplication and CREATE Email to <name>", where a synonym is used for RETRIEVE (GET). The score matching in the natural language should be able to infer intent from this for similar sounding utterances.

In further embodiments, metadata on the connector-type could be used. For example, the Email service connector may imply or identify the potential for synonyms included for actions, thus list "Send Email" or simply "Email" for example as a synonym for the "CREATE" action on the "Email" object. These may then be substituted into the examples generated for the first embodiment to provide "GET contacts from FirstApplication and Email <name>."

Thus, example conversation utterances may be generated. The skilled person will readily understand there are other methods of generating example utterances from the integration document in accordance with the teachings herein.

For example, a template utterance: "<ACTION><Object><connector><contact>" could be used to generate an example utterance. The template utterance may be repeated (in the example utterance) for each action performed by the integration task. <ACTION> could be an identified action (e.g., "CREATE", "RETRIEVE" etc.) or appropriate synonyms of identified actions, which synonyms are either generated (e.g., "RETRIEVE"="GET") or obtained from connector/application metadata (e.g., "CREATE"="EMAIL", as may be identified from EmailService application metadata). <Object> could identify the object(s) used to perform a particular action, e.g., extracted from the "business-object" of the integration document. <connector> could identify the application(s) or software used to perform the action. This may be generated based on the "connector-type" entries. <contact> could identify the type of information transferred, e.g., extracted from the "business-object" of the integration document, and/or the inputs required from a user to perform the task, e.g., extracted by identifying "Requests" of the integration document.

In this way, an example utterance may be built up using different parameters extracted from the integration document and inserted into the template utterance. Of course, synonyms (either from a thesaurus or metadata of the application associated with a particular action) may be used in place of any of the identified parameters for a template utterance.

Thus, it will be clear that internal knowledge of the integration instructions for performing a task is used to generate a conversation databank entry for processing by a natural language interface. With the knowledge of these internals a conversation databank entry can be automatically created from an integration document to understand natural language interactions from a user.

In particular, the conversation databank entry can be used to determine whether a user desires an integration task associated with the conversation databank entry to be performed and also to identify input variables for the integration task to be provided from the user's natural language input, in accordance with method 400. Thus, the natural language interface is able to identify an integration task to be performed and generate a control signal comprising instructions to perform the integration task and values for input variables required by the integration task.

Thus, step 405 of method 400 may comprise generating a control signal for initiating the execution of the integration instructions associated with each desired integration task, where the control signal comprises the one or more identified input variables in the natural language input for input to the integration instructions.

For example, a first user-provided natural language input through an application for the natural language interface may be "Send me contact information for Clive." Such an input would be matched to the example conversation databank entry above, and the natural language interface may initiate the appropriate integration task, setting the "contact" to Clive and the "to" field to "me." In other words, the natural language interface is able to identify, from the conversation databank entry, that the user intends the integration task associated with the conversation databank entry to be performed, and values for input variables of the integration task are "Clive" and "me".

For another example, a second user-provided natural language input through an application for the natural language interface may be: "What new leads are there today?" The natural language interface may then look through available conversation databank entries to identify an entry associated with an integrated task that retrieves "lead information" (e.g., from a linked FirstApplication account) and provides the lead information to the application for the natural language interface. In some embodiments, multiple possible entries may be identified that do additional things with the lead information (e.g., additional processing, or sending lead information to another user), but here user-provided natural language input indicates that the user just wants to know what the lead information contains, so the conversation databank entry associated with a simple task of retrieving and providing the lead information to the user is selected, and the corresponding integration task initiated by the natural language interface.

For a third example, a third user-provided natural language input through an application for the natural language interface may be: "Can you make sure that my contacts are in sync?" The natural language interface could analyze the conversation databank entries to identify one associated with an integration task that syncs between "FirstApplication" and "SecondApplication" contacts. In some examples, the natural language interface may require a minimum confidence level before initiating an integration task (e.g., there must be a suitably high match between a user's natural language input and example natural language inputs of the conversation databank entry associated with the task). Thus, the natural language interface may wish to confirm the user's intent before performing the task and may therefore respond to the user something like "Are you referring to your FirstApplication" and "SecondApplication" contacts?", to which the user may respond "Yes." The natural language interface may then initiate the integration task associated with the identified and confirmed conversation databank.

Thus, in some embodiments, a method of operating a natural language interface comprises communicating with the user to resolve any misunderstood or incomplete natural language inputs, or natural language inputs for which the method is not confident (e.g., having a confidence level below a predetermined value) is associated with a particular conversation databank entry.

In further embodiments, the step of determining task information comprises determining reference information representative of any references or execution triggers to one or more other integration instructions for a respective one or more other integration tasks, so that the task information comprises the reference information. In this way, references to other integration tasks may be used to generate a conversation databank entry. In particular, integration instructions (of an integration document) for the referenced integration task may also be processed (in a similar/identical manner to the originating integration instructions) in order to generate the conversation databank entry.

For example, consider a scenario in which a first integration task appears to perform only a read operation (e.g., a RETRIEVE action), but also references a second integration that performs a write operation (e.g., a CREATE action). Without understanding the reference to the second integration task, if user asks to "get me all the contacts" (i.e., they do not want anything to be "CREATED") the first integration task may be undesirably performed. However, if the reference to the second integration task is understood, the first integration task may be excluded from the possible list of integration tasks to be performed, confidence level reduced, or the user may be prompted and informed. In this way, a likelihood of an inappropriate integration task being performed is reduced.

Conversely, in another scenario, a first integration task may invoke a second integration task that retrieves contacts from Application1 (thus indirectly retrieving Application1 contacts), then send an Email. If the user utters "Send all Application1 contacts to my@email.com" then if the method had not followed the chain from the first integration task to the second integration task it would not know that the first integration task retrieves contact information from Application1 and would therefore not be able to identify the appropriate integration task correctly for the intended user action. Thus, it may be important to also process referenced integration instructions and/or documents in order to generate a more accurate conversation databank entry.

Figure 5:
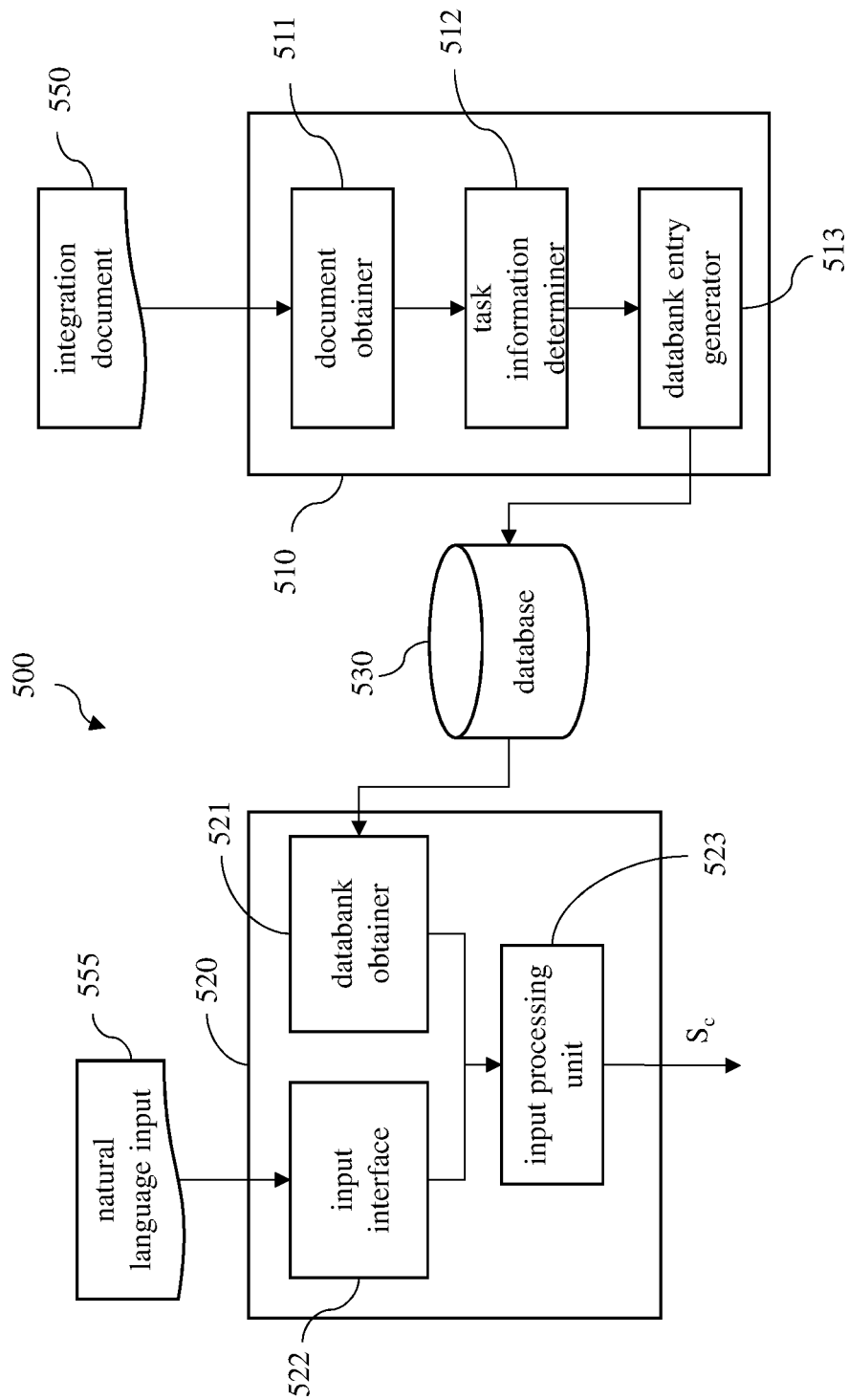
FIG. 5 is a block diagram of a natural language interface system comprising a system for generating a conversation databank entry and a natural language interface according to some embodiments of the present disclosure.

FIG. 5 illustrates a block diagram of a system 510 for generating a conversation databank entry in the context of a natural language interface system 500, in accordance with some embodiments of the present disclosure. The natural language interface system 500 also comprises a natural language interface 520 adapted to receive a natural language input 555 from a user.

The system 510 comprises a document obtainer 511 adapted to obtain an integration document 550 comprising integration instructions that, when executed, causes two or more software applications to interact or exchange information to thereby perform an integration task.

The system 510 also comprises a task information determiner 512 adapted to determine, from the integration instructions of the integration document, task information representative of at least the integration task.

The system 510 also comprises a databank entry generator 513 adapted to generate, based on the task information, a conversation databank entry for a natural language interface, where the conversation databank entry is usable by the natural language interface to determine whether a user desires the integration task to be performed, by processing the conversation databank entry and a natural language input provided by the user to the natural language interface.

The system 510 may store the conversation databank entry generated by the databank entry generator 513 in a database 530.

The natural language interface 520 comprises a databank obtainer 521 adapted to obtain one or more conversation databank entries generated by the system 510. For example, the databank obtainer may communicate with the database 530 in order to obtain the one or more conversation databank entries.

The natural language interface 520 also comprises an input interface 522 adapted to obtain a natural language input 555 provided by a user. The input interface 522 may comprise an input/output interface for communicating with an external device such as a keyboard or microphone adapted to receive a natural language input from a user. The input interface may perform processing on the natural language input, such as speech processing or the like.

The natural language interface 520 also comprises an input processing unit 523. The input process unit 522 is adapted to process the natural language input and the at least one conversation databank entry to determine whether the user desires any one or more integration tasks associated with any one or more of the conversation databank entries to be performed. In response to determining that the user desires an integration task associated with any of the conversation data bank entries to be executed, the input processing unit 523 is adapted to generate a control signal $S_C$ for initiating the execution of the integration instructions associated with each desired integration task.

The control signal $S_C$ generated by the input processing unit may, for example, be passed to a further processor or processing system for executing the desired integration task. Thus, the control signal $S_C$ may initiate the execution of the desired integration task in a further processor or processing system.

In some embodiments, the system 500 is separate from the system that executes the integration instructions to perform the integration task and/or the system that initially (i.e., directly) obtains the natural language input from the user.

For example, the natural language interface system 500 may be an aspect of a cloud-computing system, where the natural language input is obtained from a mobile/cellular phone or personal computer and the control signal $S_C$ is sent by the cloud-computing system to the mobile/cellular phone or personal computer to instruct execution of the integration instructions.

As previously explained, the control signal $S_C$ may also comprise values for input variables of the integration task to be performed by the further processor or processing system. The input processing unit may obtain such values from the natural language input or from a further natural language input.

In some examples, the control signal $S_C$ also comprises the integrations instructions for the desired task to be performed by a further processor or processing system. In this way, the further processor or processing system need not store integration documents or integration instructions, reducing a burden on said further processor or processing system.

Figure 6:
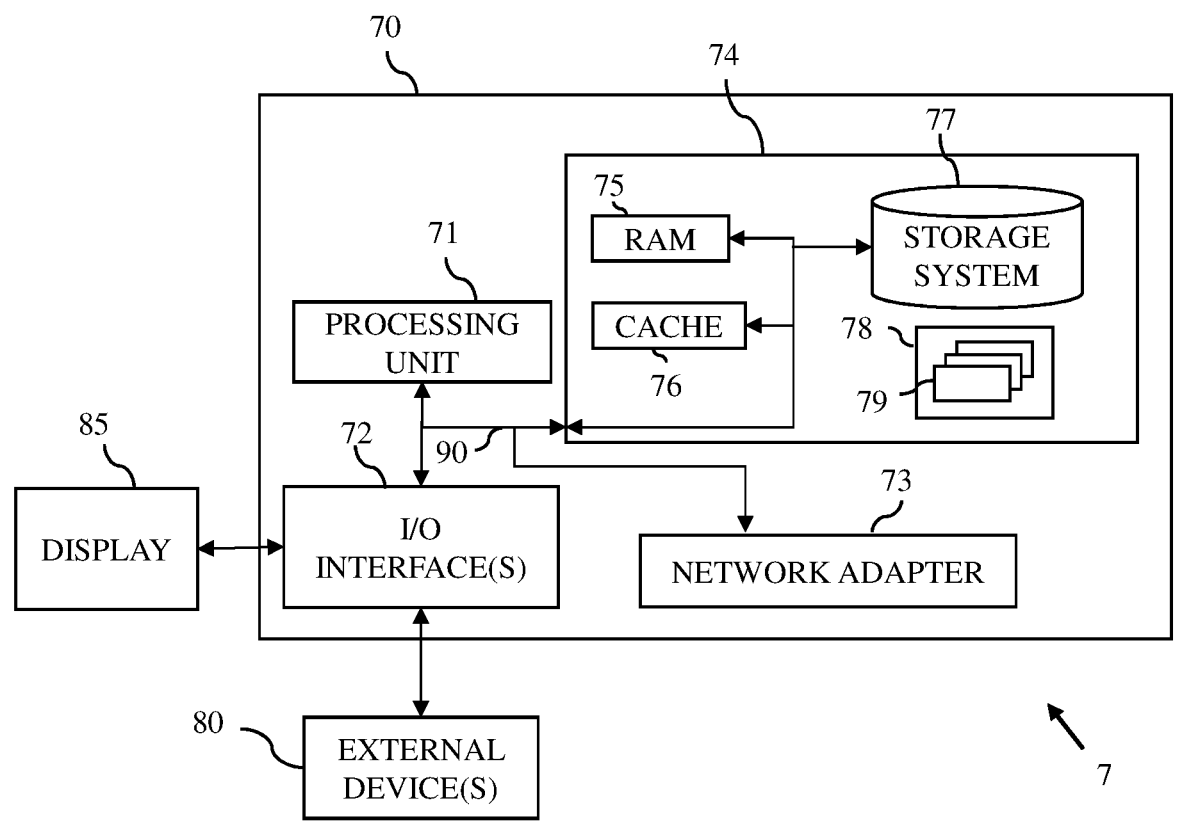
FIG. 6 illustrates a system according to some embodiments of the present disclosure.

FIG. 6 illustrates a system 7 according to some embodiments of the present disclosure. System 7 can comprise a processing arrangement adapted to carry out any method previously described. Embodiments may comprise a computer system 70, which may form part of a networked system 7 in FIG. 6. The components of computer system/server 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 can include a variety of computer system readable media. Such media may be any available media that is accessible by computer system/server 70, and it includes both volatile and non-volatile media and removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 77 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the disclosure.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the disclosure as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present disclosure constitute a method, it should be understood that such a method is a process for execution by a computer, i.e., is a computer-implementable method. The steps of the method therefore reflect various parts of a computer program, e.g., parts of one or more algorithms.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
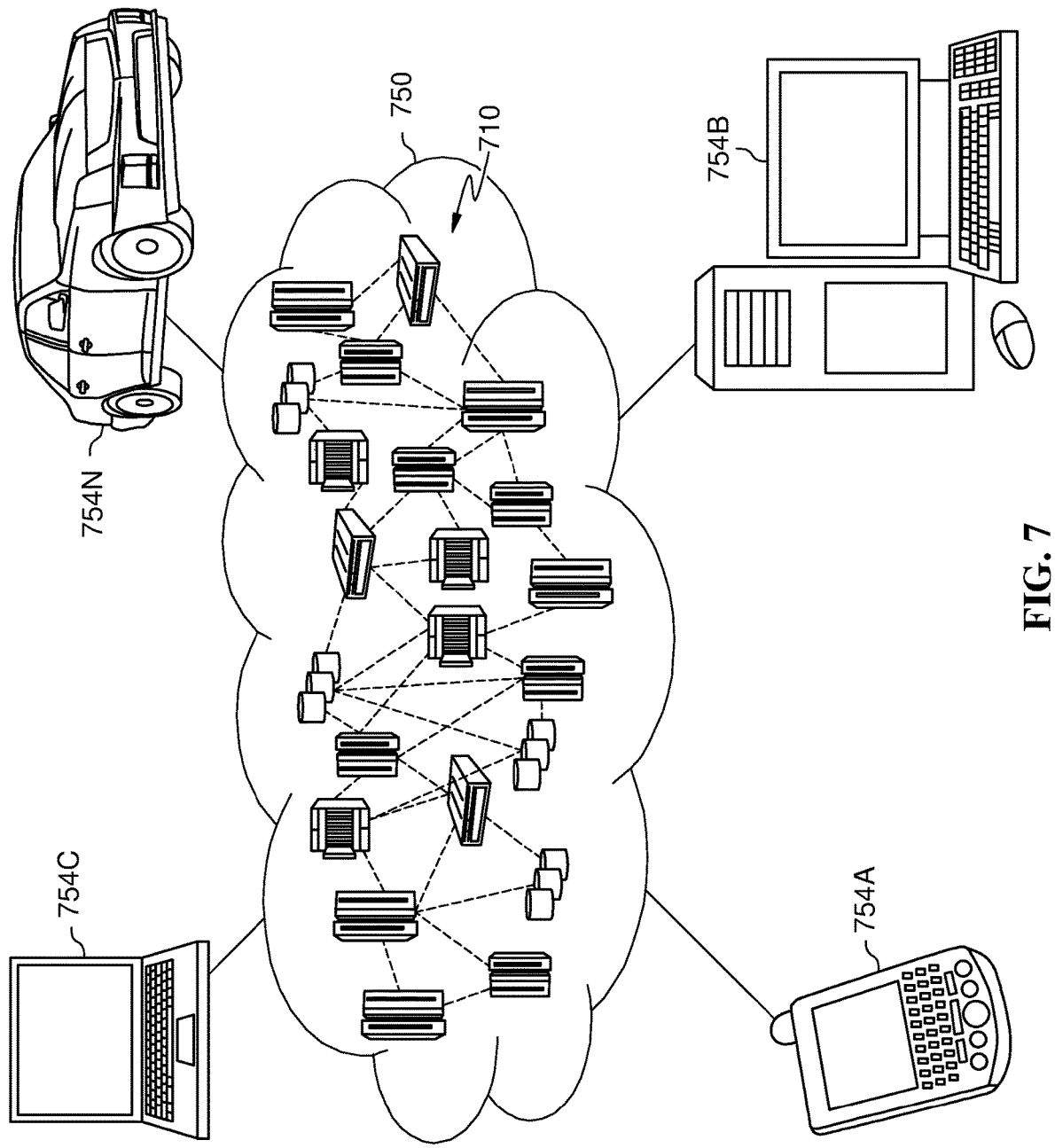
FIG. 7 depicts a cloud computing environment according to an embodiment of the present disclosure.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
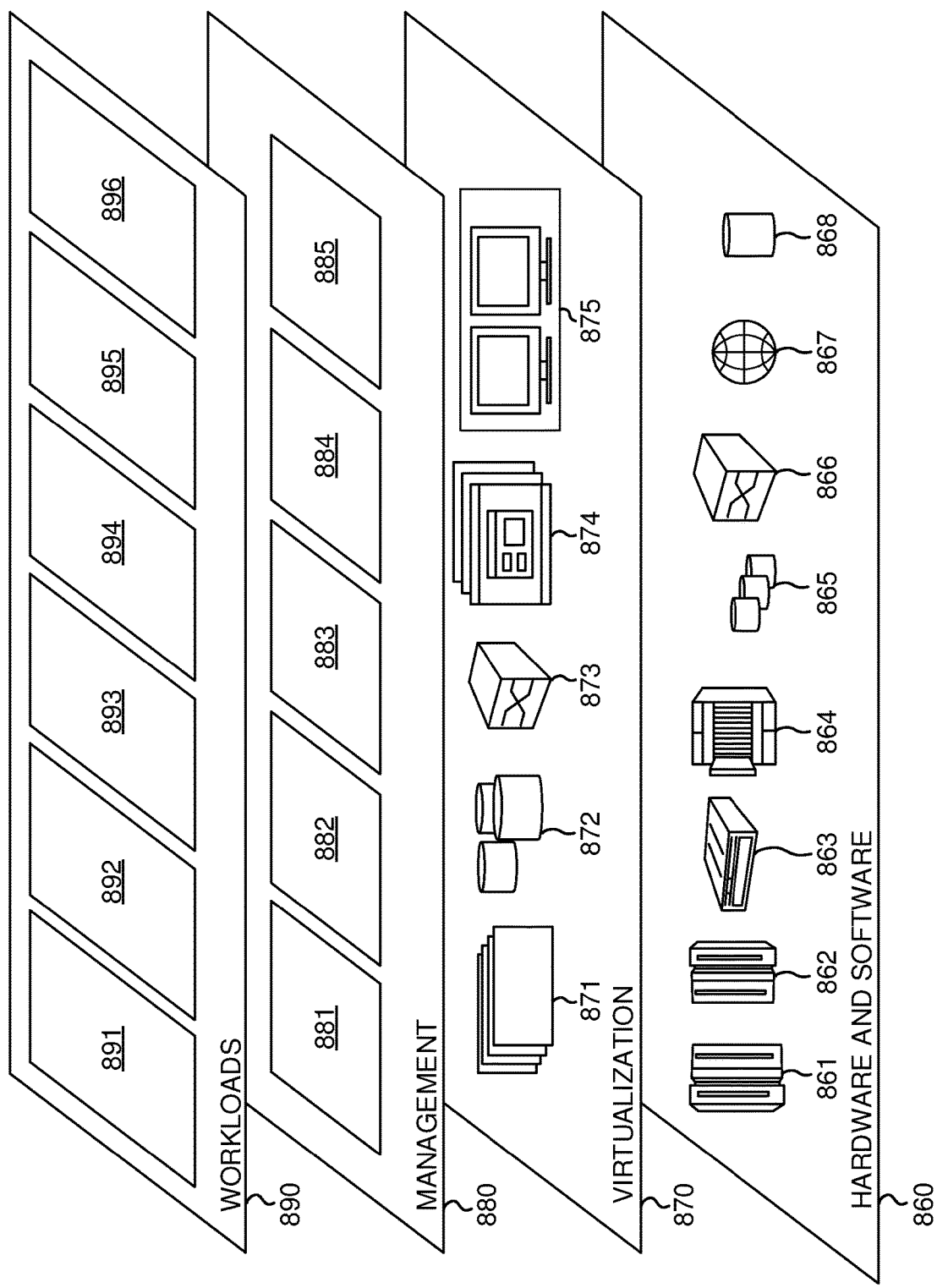
FIG. 8 depicts abstraction model layers according to an embodiment of the present disclosure.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and conversation databank entry generator and natural language interface 896. Conversation databank entry generator and natural language interface 896 can be a workload or function such as that described in FIGS. 3 and 4 above.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, the computer-implemented method comprising:

obtaining an integration document comprising integration instructions that, when executed, causes two or more software applications to interact to perform an integration task;

determining, from the integration instructions of the integration document, task information representative of at least the integration task; and generating, based on the task information, a conversation databank entry for a natural language interface, wherein the conversation databank entry is usable by the natural language interface to determine whether a user desires the integration task to be performed, by processing the conversation databank entry and a natural language input provided by the user to the natural language interface.

2. The computer-implemented method of claim 1, wherein the integration document is formed of computer code which provides the integration instructions on how the two or more software applications are to interact to perform the integration task.

3. The computer-implemented method of claim 1, wherein generating a conversation databank entry further comprises generating one or more example natural language inputs based on the task information, and wherein the one or more example natural language inputs are usable by the natural language interface to compare to a natural language input provided by the user to determine whether the user desires the task performed by the integration process to be performed.

4. The computer-implemented method of claim 1, wherein determining task information further comprises determining identity information representative of the identity of the two or more software applications, and wherein the task information further comprises the identity information.

5. The computer-implemented method of claim 1, wherein determining task information further comprises determining actions performed using the two or more software applications when the integration instructions are executed, and wherein the task information comprises the determined actions.

6. The computer-implemented method of claim 1, wherein determining task information comprises determining reference information representative of one or more references to one or more other integration instructions for a respective one or more other integration tasks, and wherein the task information further comprises the reference information.

7. The computer-implemented method of claim 1, wherein determining task information comprises determining variable information representative of at least one input variable of the integration task, and wherein the task information further comprises the variable information.

8. The computer-implemented method of claim 7, wherein the conversation databank entry further identifies the at least one input variable of the integration task.

9. The computer-implemented method of claim 1, the method further comprising:
obtaining the natural language input provided by the user;
processing the natural language input and the conversation databank entry to determine whether the user desires the integration task to be performed; and
in response to determining that the user desires the integration task to be performed, generating a control signal for initiating the execution of the integration instructions.

10. The computer-implemented method of claim 9, wherein determining task information comprises determining variable information representative of at least one input variable of the integration task, and wherein the task information further comprises the variable information;
wherein the conversation databank entry further identifies the at least one input variable of the integration task; and the method further comprising:
identifying one or more input variables in the natural language input; and
generating a control signal for initiating the execution of the integration instructions, and wherein the control signal comprises the one or more identified input variables in the natural language input for input to the integration instructions.

11. The computer-implemented method of claim 1, wherein the integration instructions, when executed, cause at least three software applications to interact to perform the integration task.

12. A computer program product, the computer program product comprising a computer readable storage medium having program instructions embodied therewith, wherein the computer readable storage medium is not a transitory signal per se, the program instructions executable by a computer to perform a method comprising:
obtaining an integration document comprising integration instructions that, when executed, causes two or more software applications to interact to perform an integration task;
determining, from the integration instructions of the integration document, task information representative of at least the integration task; and
generating, based on the task information, a conversation databank entry for a natural language interface, wherein the conversation databank entry is usable by the natural language interface to determine whether a user desires the integration task to be performed, by processing the conversation databank entry and a natural language input provided by the user to the natural language interface.

13. The computer program product of claim 12, wherein generating a conversation databank entry further comprises generating one or more example natural language inputs based on the task information, and wherein the one or more example natural language inputs are usable by the natural language interface to compare to a natural language input provided by the user to determine whether the user desires the task performed by the integration process to be performed.

14. The computer program product of claim 12, wherein determining task information further comprises determining actions performed using the two or more software applications when the integration instructions are executed, and wherein the task information comprises the determined actions.

15. The computer program product of claim 12, wherein determining task information comprises determining variable information representative of at least one input variable of the integration task, and wherein the task information further comprises the variable information, and wherein the conversation databank entry further identifies the at least one input variable of the integration task.

16. The computer program product of claim 12, the method further comprising:
obtaining the natural language input provided by the user;
processing the natural language input and the conversation databank entry to determine whether the user desires the integration task to be performed; and
in response to determining that the user desires the integration task to be performed, generating a control signal for initiating the execution of the integration instructions.

17. A system, the system comprising:
one or more processors; and
a memory communicatively coupled to the one or more processors,
wherein the memory comprises instructions which, when executed by the one or more processors, cause the one or more processors to perform a method comprising:
obtaining, by a document obtainer adapted to obtain integration documents, an integration document comprising integration instructions that, when executed, causes two or more software applications to interact to perform an integration task;

determining, from the integration instructions of the integration document, task information representative of at least the integration task; and generating, based on the task information, a conversation databank entry for a natural language interface, wherein the conversation databank entry is usable by the natural language interface to determine whether a user desires the integration task to be performed, by processing the conversation databank entry and a natural language input provided by the user to the natural language interface.

18. The system of claim 17, the method further comprising:

obtaining the natural language input provided by the user;

processing the natural language input and the conversation databank entry to determine whether the user desires the integration task to be performed; and in response to determining that the user desires the integration task to be performed, generating a control signal for initiating the execution of the integration instructions.

19. The system of claim 18, wherein processing the natural language input and the conversation databank entry to determine whether the user desires the integration task to be performed comprises:

determining a confidence level that the natural language input provided by the user corresponds to a given databank entry;

comparing the confidence level to a predetermined value; and in response to the confidence level exceeding the predetermined value, determining that the user desires the integration task related to the given databank entry to be performed.

20. The system of claim 19, wherein the confidence level indicates how similar the example natural language inputs of the given conversation databank entry are to the natural language input provided by the user.

* * * * *